(12) United States Patent
Nozaki et al.

(10) Patent No.: US 6,421,470 B1
(45) Date of Patent: Jul. 16, 2002

(54) IMAGE PROCESSING APPARATUS AND AUDIO-CODED RECORDING MEDIA

(75) Inventors: Iwao Nozaki, Wakayama; Shinichi Imade, Iruma; Kenji Yoshioka, Hachioji, all of (JP)

(73) Assignees: Noritsu Koki Co., Ltd., Wakayama-Ken; Olympus Optical Co., Ltd., Tokyo, both of (JP)

( * ) Notice: Subject to any disclaimer, the term of this patent is extended or adjusted under 35 U.S.C. 154(b) by 0 days.

(21) Appl. No.: 09/194,811

(22) PCT Filed: Jun. 5, 1998

(86) PCT No.: PCT/JP98/02494

§ 371 (c)(1),
(2), (4) Date: Dec. 2, 1999

(30) Foreign Application Priority Data

Jun. 30, 1997 (JP) .............................. 9-174416
Oct. 17, 1997 (JP) .............................. 9-284828

(51) Int. Cl.[7] .............................. G06K 7/10; G06K 9/20
(52) U.S. Cl. .............................. 382/321; 707/500.1
(58) Field of Search .............................. 382/183, 317, 382/321, 232; 235/454, 462.13, 470; 388/474; 345/302; 355/40; 707/500.1

(56) References Cited

U.S. PATENT DOCUMENTS

| | | | |
|---|---|---|---|
| 5,276,472 A | 1/1994 | Bell et al. | .................. 396/312 |
| 5,614,946 A | * 3/1997 | Fukuoka | ...................... 382/232 |
| 5,650,826 A | 7/1997 | Eitz | ............................ 348/468 |
| 5,757,468 A | * 5/1998 | Patton et al. | ................. 355/40 |
| 5,873,735 A | * 2/1999 | Yamada et al. | ............. 382/183 |

FOREIGN PATENT DOCUMENTS

| | | | |
|---|---|---|---|
| JP | 7181606 | 7/1995 | .......... G03B/31/02 |
| JP | 7214939 | 8/1995 | ............ B42D/1/00 |
| JP | 9149365 | 6/1997 | ............ H04N/5/91 |

* cited by examiner

Primary Examiner—Timothy M. Johnson
(74) Attorney, Agent, or Firm—Fulbright & Jaworski L.L.P.

(57) ABSTRACT

An image processing apparatus capable of simply and reliably handling two different forms of information, audio and image, as linked together in order to record the information on the same recording medium. This image processing apparatus has an image input unit (10) for inputting image information, an audio input unit (60) for inputting audio information, a link processing unit (130a) for setting link information to link the image information and audio information, a code converter (242) for converting the audio information into an optically readable audio code image, and a printing device (30) operable based on the link information for recording a visual image corresponding to the image information and the audio code image on a predetermined recording medium. One can not only visually enjoy the image recorded on the recording medium, but hear a sound from the audio code image recorded on the recording medium with an appropriate reproduction device.

3 Claims, 18 Drawing Sheets

(a)

| image serial No. | individual No. | input mode No. | ID No. (film No.) | frame No. |
|---|---|---|---|---|

D1

(b)

| image ID | image information |
|---|---|

D2

(c)

| image ID | audio information |
|---|---|

D3

FIG.12
(a)
(b)
(c)
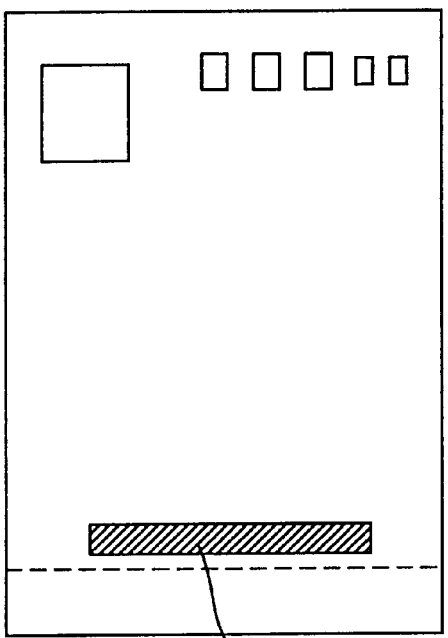
(d)

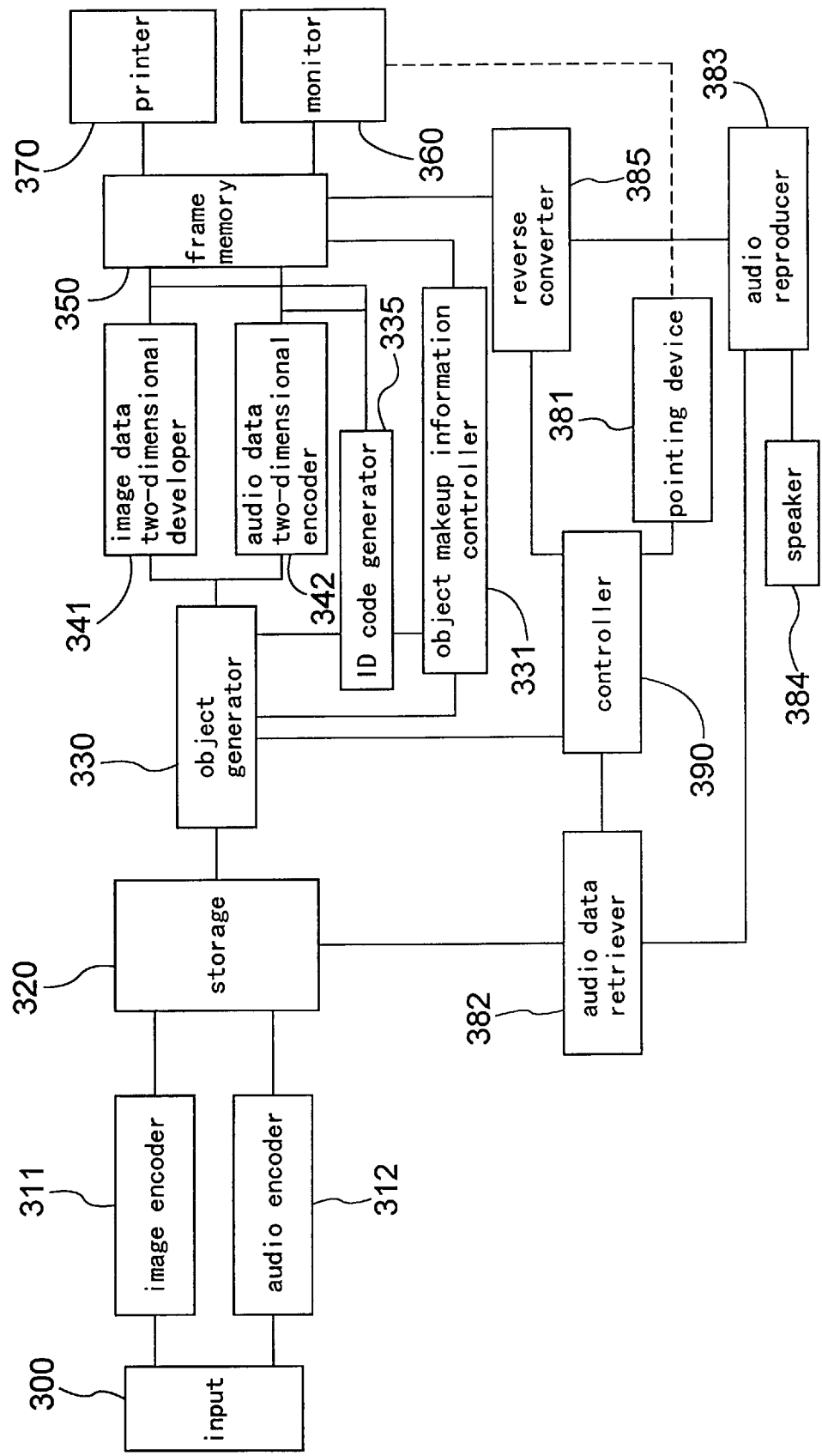

IMAGE PROCESSING APPARATUS AND AUDIO-CODED RECORDING MEDIA

TECHNICAL FIELD

This invention relates to image processing apparatus for printing, with optically readable audio code images added, images acquired with silver salt type cameras, image data handling digital still cameras, image reading scanners and the like.

BACKGROUND ART

Images photographed with various image acquiring devices are printed on printing paper by the silver salt photographic method, or on paper or film by using an ink jet printer, thermal printer or the like. Thus, over long years, information on photographic objects has been transmitted in the form of still images relying on the sense of sight across wide areas and in a timeless way.

Recently, with the advent of the multimedia age, vigorous attempts have been made to use the sense of hearing in the transmission of information, instead of relying solely on the sense of sight. Olympus Optical Co., Ltd., which is one of the joint applicants in this application, also has proposed new media for providing not only visible but audible information in Japanese Patent Laying-Open Publication H6-231466 and Japanese Patent Laying-Open Publication H7-181606, for example. According to this technique, recording media include sound converted into optically readable dot codes (audio code images) which are printed along with pictures, photographs or characters on the same paper, the dot codes being read with a special scanner. These new media are suited to various applications including language teaching materials for use in repeating pronunciation practice, illustrated reference books for recording animal cries, picture books which emit sound, and photographs for recording memorial events such as wedding, coming-of-age ceremony and celebration for children.

With the above new media technique, audio-coded photographs with audio code images corresponding to a plurality of image information (still images such as photographs) and a plurality of audio information may be made, for example, by recording animal cries on animal photographs, or recording voices of a plurality of people on snapshots of these people simultaneously with or after the photo taking. These photographs provide a salient improvement upon conventional photographs in enhancing the realism and communicable information of acquired images. However, what is important here is to associate pieces of information accurately when recording both image information and audio information on prints or other recording media.

A detailed disclosure concerning the association of such image information and audio information is not given in Patent Laying-Open Publication H6-231466 noted above, or in other publications disclosing recording on recording media of both image information and encoded audio information, such as Japanese Laying-Open Publication S56-5600, Japanese Laying-Open Publication S60-244146, Japanese Patent Laying-Open Publication H5-224320 and Japanese Patent Laying-Open Publication H7-181606.

Why association is important is that, since audio code images on finished audio-coded photographs themselves cannot be confirmed visually, a situation could arise, depending on an arrangement of visual images and audio code images, where it is impossible to determine which one of a plurality of visual images corresponds to a given audio code image. Such collation is difficult particularly with audio-coded photographs having audio code images arranged en bloc in a particular area to facilitate scanning and reading of audio codes with a scanner.

An object of this invention is to provide an image processing apparatus for simply and reliably handling two different types of information, i.e. audio and image, as associated with each other, and audio-coded photographs for allowing audio and image to be collated easily even where the audio-coded photographs have a plurality of visual images and a plurality of audio code images arranged thereon.

DISCLOSURE OF THE INVENTION

To fulfill the above object, an image processing apparatus according to this invention comprises image input means for inputting image information, audio input means for inputting audio information, link processing means for setting link information to link said image information and said audio information, code converting means for converting said audio information into an optically readable audio code image, and a printing device operable based on said link information for recording a visual image corresponding to said image information and said audio code image on a predetermined recording medium.

In this construction, link information is set for linking image information and audio information. Based on this link information, a visual image corresponding to the image information and an audio code image corresponding to the audio information may be recorded as linked to each other on a predetermined recording medium. The recording medium here refers to any of various hard copy materials such as ordinary printing paper and printing film, or photosensitive materials such as printing paper and film (negative and positive).

In one preferred embodiment of this invention, said code converting means comprises compressing and encoding means for compressing and encoding said audio information, and audio code image generating means for converting said audio information compressed and encoded, into an optically readable audio code image. Thus, the audio information may be converted into an optically readable audio code image compactly and reliably.

Further, in one preferred embodiment of this invention, said code converting means is operable to convert both of said audio information and said link information into an optically readable audio code image. Thus, the audio information may be reproduced only by decoding the code data read. The relationship between the image information and audio information may be grasped reliably.

As a preferred embodiment of this invention, said link information includes layout information showing an arrangement of said visual image and said audio code image to be recorded on said recording medium. The layout information may be grasped only by decoding the audio code image read. This is advantageous particularly when making duplicates. Further, said link information may include source address information showing image information or a source storage of said visual image and audio information or a source storage of said audio code image to be recorded on said recording medium. Then, original data may be located with ease to simplify a duplicating operation.

Further, said link information may be a recognition sign applied commonly to said image information and said audio information and showing a correspondence therebetween, and said printing device may be operable to visibly display and record said recognition sign. Then, the relationship between the image information and audio information may be grasped visually and reliably.

In another preferred embodiment of this invention, said printing device is operable to record said audio code image in a blank region outside a visual image recording region or on the back of said recording medium. Then, the recording position of the code image may be separated from the recording region of the image information to allow the image information to be grasped reliably and the audio code image read to be decoded effectively. Said printing device may be operable to record said audio code image in superimposition on said visual image. Then, the audio code image may be recorded without reducing the size of the visual image recording region.

Said printing device may be operable to combine and record said visual image and said audio code image. Then, the audio code image may be recorded without reducing the size of the visual image recording region.

Said printing device may be operable to record said visual image and said audio code image on a print recording medium. Then, information recorded in the image information and audio code image may be grasped by using an inexpensive and handy print recording medium. This new print recording medium may be diffused widely.

Further, said printing device may be operable to record said visual image and said audio code image on a photosensitive recording medium, e.g. negative or positive film, printing paper or the like. Then, information recorded in the image information and audio code image may be grasped accurately by using a photosensitive recording medium of high image quality, and high image quality specifications, may be satisfied.

As a further preferred embodiment of this invention, said image input means acquires image information by using at least one of a scanner for reading photographic images formed on a photograph film or photographic images formed on photographic prints, an image signal input unit for taking in photographic images photographed with a digital still camera or a video movie camera, and an image signal input unit for taking in images made or edited with a computer. In this case, a variety of image input means including public communications networks (telephone, Internet and so on) are applicable to suit various uses.

In a different preferred embodiment of this invention, said link processing means comprises an ID information applying means for applying ID information as said link information to identify at least one of said image information and said audio information, and sets link information for linking one to the other of said image information and audio information based on said ID information. In this construction, an operation may be carried out while reliably maintaining, without duplicating, the relationship between the image information and audio information, by applying the link information based on identifiable ID information.

Further, said link processing means may comprise monitor means for monitoring at least one of said image information and said audio information, and information designating means for designating information so that one links to the other of said image information and said audio information monitored by said monitor means, and set link information based on an output from this information designating means and said ID information. In this case, the link information may be set reliably to suit the user's wish, without duplicating the correspondence between the image information and audio information by designating information to be linked and providing link information while monitoring the image information and audio information on the monitor means such as a CRT.

The information designating means may be a pointing device, e.g. a keypad, a mouse, a track pad and a touch panel, operable by a user to designate desired information regarding said image information or said audio information outputted to said monitor means. Then, the link information may be set reliably and simply to suit the user's wish.

To achieve a different object of this invention, an audio-coded recording medium according to this invention is characterized in that visual images corresponding to a plurality of image information and a plurality of audio code images corresponding thereto are arranged, and recognition signs showing a correspondence between image information and audio information are visibly displayed and recorded.

In this construction, since a recognition sign which can be confirmed visually is applied to the visual image and the audio code image corresponding thereto, the audio code image corresponding to the visual image may be selected visually when scanning the audio code with a scanner. The recognition sign is used here in a broad sense, and is defined as a term including not only numerals and characters but of course a line or the like connecting the visual image and the audio code, and codes which emit sound and/or light.

Further, as a preferred embodiment of this invention, a plurality of audio code images are collectively arranged in a predetermined audio code image recording region. Then, by setting a lower portion of a photograph to be an audio code area, for example, positioning of a scanner may be made easily when scanning and reading an audio code. In this case, each audio code image is disposed in a position away from a corresponding visual image. However, the recognition code allows the audio code image corresponding to the visual image to be grasped reliably. This provides an especially important advantage in fields such as photographically illustrated reference books having numerous visual images and audio code images arranged on one leaf (one page).

Other features and advantages of this invention will be apparent from the following description of embodiments of the invention to be taken with reference to the drawings.

BRIEF DESCRIPTION OF THE DRAWINGS

FIGS. 12a–d are views showing New Year's photo cards as examples of audio-coded recording media;

FIG. 20 is a functional block diagram showing the apparatus for making photographs with audio code images in one embodiment of this invention.

BEST MODE FOR CARRYING OUT THE INVENTION

Figure 1:
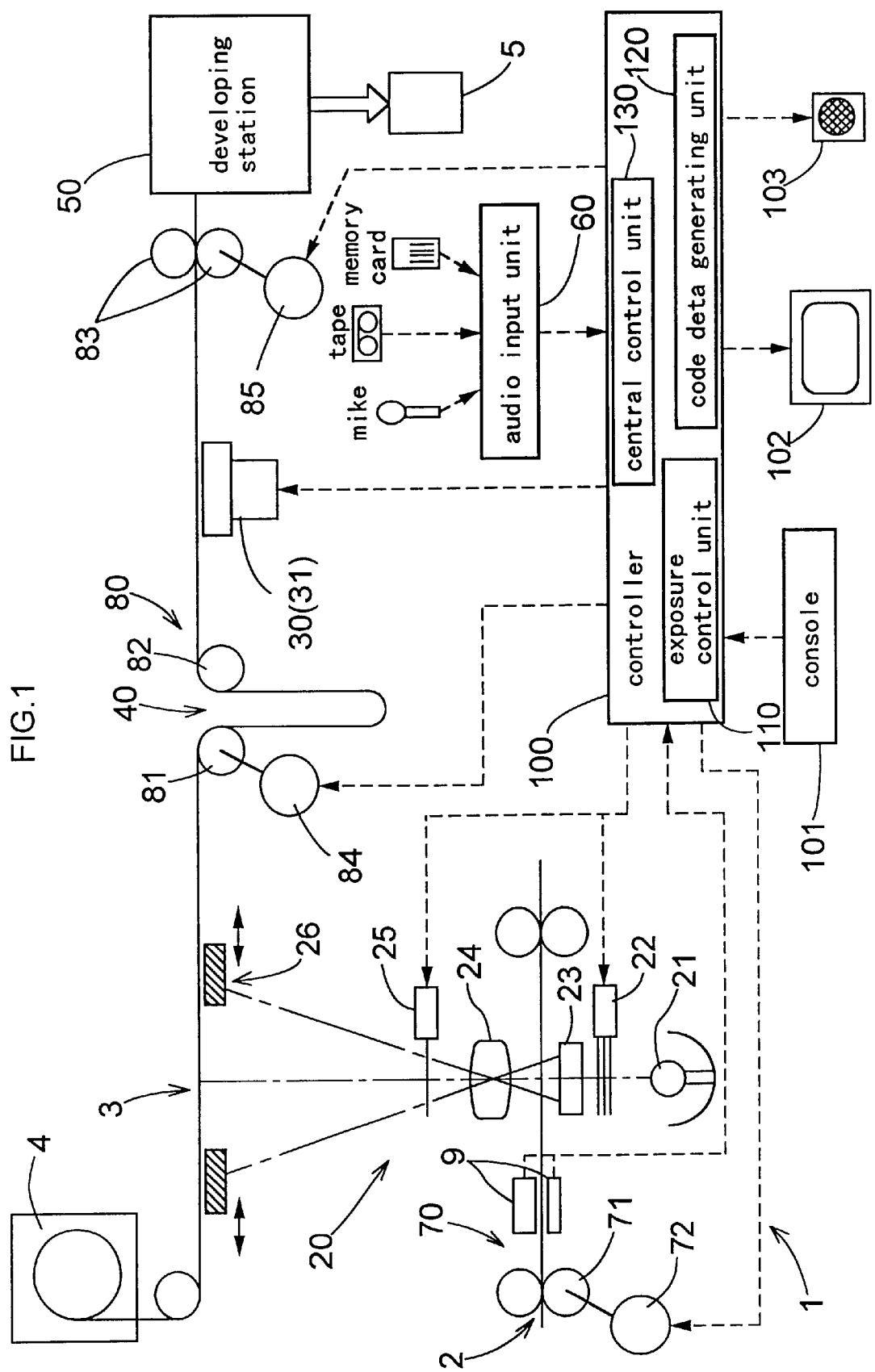
FIG. 1 is a block diagram showing an outline of a photo processing apparatus which is one embodiment of image processing apparatus according to this invention.

FIG. 1 is a block diagram of a photo processing apparatus 1 which is one form of image processing apparatus for making audio-coded recording media (photographs) according to this invention. This photo processing apparatus 1 includes a projecting and exposing station 20 for projecting photographed images of photographic film 2 (hereinafter called the film) to printing paper 3 acting as a photosensitive material, a CRT printer or PLZT printer acting as a silver salt color printing paper (photosensitive material) printer 31 acting as a printing device 30 for printing audio code images on the printing paper 3, a loop forming station 40 for forming a loop of printing paper 3 to transport the printing paper 3 independently for printing processes at the projecting and exposing station 20 and at the photosensitive material printer 31, a developing station 50 for developing printing paper 3 after the printing processes, an audio signal input unit 60 for acquiring audio signals, and a controller 100 for controlling the components of the photo processing apparatus 1 and computing various data. The controller 100 has, connected thereto, a console 101 for inputting various information, and a monitor 102.

Figure 2:
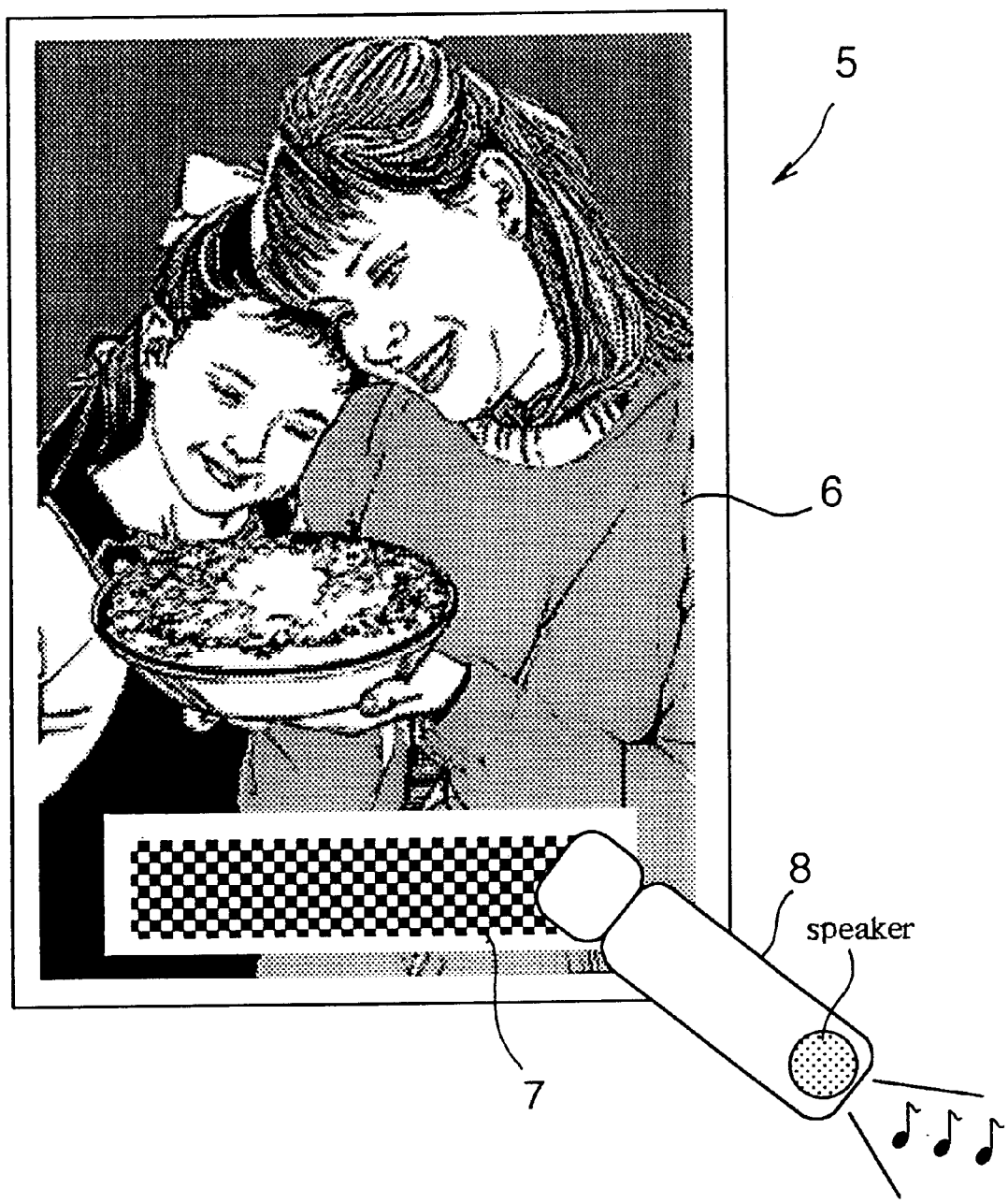
FIG. 2 is an explanatory view showing an audio reproduction from a photograph with an audio code image according to this invention.

The printing paper 3 drawn out of a printing paper magazine 4 storing the printing paper 3 in a roll has photographed images printed thereon from the film at the projecting and exposing station 20, and audio code images printed at the CRT printer 31, and is thereafter developed at the developing station 50, as shown in FIG. 2, cut to a size including a photograph (visual image) 6 and an audio code image 7 for one frame of the film, and discharged as audio-coded photographic prints 5. When this audio code image 7 is scanned manually with a special reading scanner 8, a sound corresponding to the audio code image 7 is outputted from the speaker by the action of an audio reproduction circuit mounted in the scanner 8, The respective components shown in FIG. 1 will be described hereinafter.

The projecting and exposing station 20 includes an exposing light source 21, a light adjustment filter 22 for adjusting a color balance of light irradiating the film 2, a mirror tunnel 23 for uniformly mixing the colors of the light having passed through the light adjustment filter 22, a printing lens 24 and a shutter 25 for forming images of film 2 on the printing paper 3, and a paper mask 26 for setting an exposure area to the printing paper 3, all arranged on the same optical axis providing an exposure optical path.

A photographic image scanner 9 is disposed on a film transport path upstream of the projecting and exposing station 20 for scanning the photographed images formed on the film 2 and acquiring them as digital images. The scanner 9 irradiates the film 2 with white light, separates the light reflected from or transmitted through the film 2 into three primary colors of red, green and blue, which are detected by a CCD line sensor, put to an A/D conversion and transmitted to the controller 100.

Figure 3:
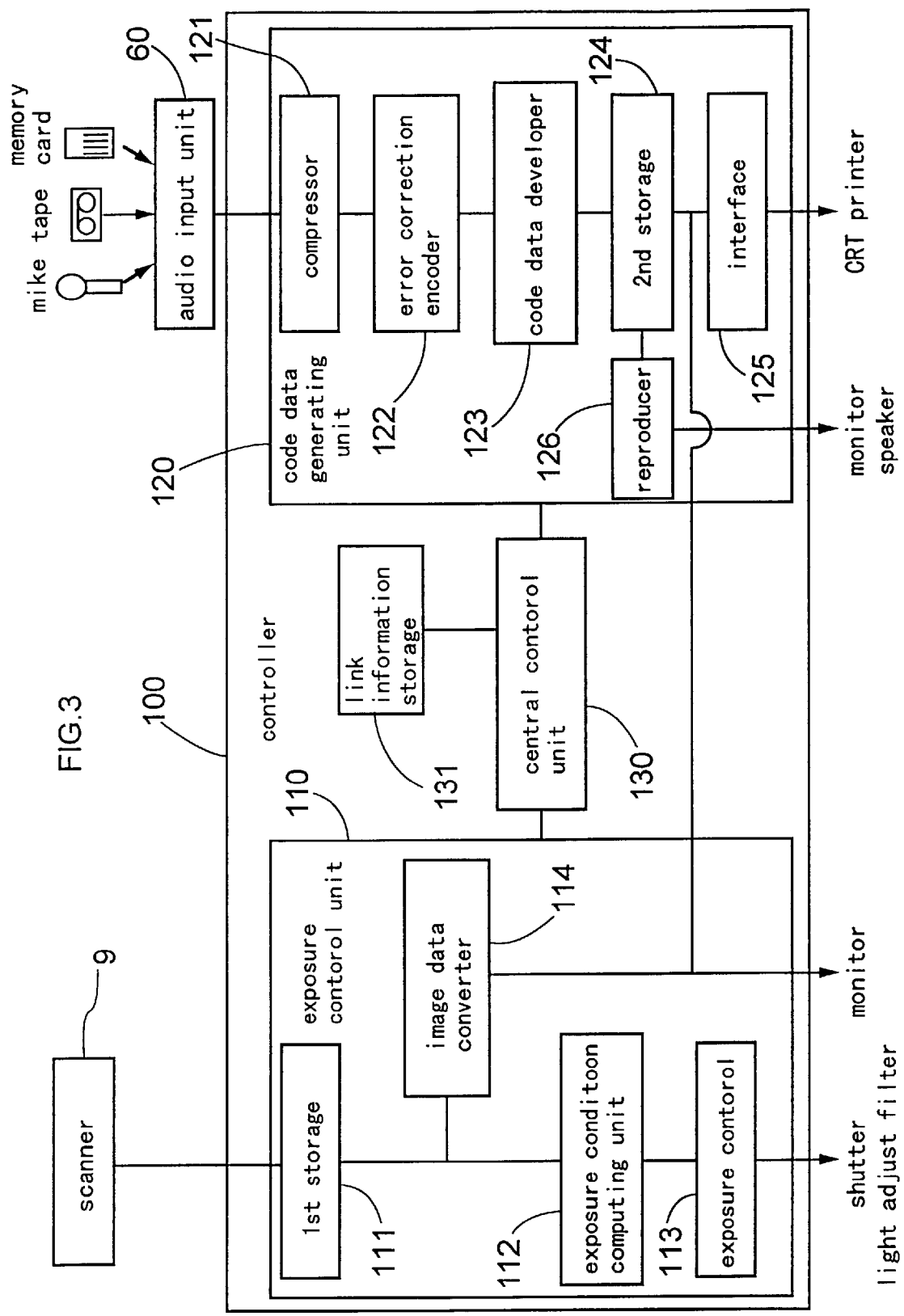
FIG. 3 is a block diagram showing main functions of a controller.

As shown in FIG. 3, the controller 100 includes an exposure control unit 110 whose main function is exposure control of the projecting and exposing station 20, a code data generating unit 120 for processing the audio signals inputted from the audio input unit 60 to generate corresponding audio code data, and a central control unit 130 for controlling these units 110 and 120.

The exposure control unit 110 includes a first storage 111 for storing the image data received from the scanner 9, an exposure condition computing unit 112 for determining exposure conditions by using the image data stored in the first storage 111, an exposure controller 113 for controlling operation of the light adjustment filter 22 and shutter 25 at the projection exposure station 20 based on the exposure conditions determined by the exposure condition computing unit 112, and an image data converter 114 for converting the image data read from the first storage 111 into simulated image data for display on a monitor display 102 based on the exposure conditions determined by the exposure condition computing unit 112. Various parameters recorded in the image data converter 114 for use in conversion processes such as a negative-to-positive conversion of image data are set to display images on the monitor display 102 which are equivalent of images to be formed on the printing paper 3 by projecting the photographed image frames of photographic film 2 with the exposure conditions determined by the exposure condition computing unit 112. If simulated images displayed on the monitor display 102 are unsatisfactory, the exposure conditions may be altered by using the console 101 to manually input variations in exposure of each of Y (yellow), M (magenta) and C (cyan) or average variations in exposure corresponding to density variations of the photographs.

Audio information inputted to the audio input unit 60 through audio recording media such as a microphone, tape-recorder, CD, MD and memory card, or public communications networks such as the telephone and Internet, are transmitted to the code data generating unit 120 after an A/D conversion in the case of analog audio signals, or as data in the case of digital signals. The code data generating unit 120 includes a compressor 121 for compressing digital audio signals, an error correction encoder 122 for adding error correction codes by an error correction code algorithm based on a coding theory, a code data developer 123 for developing the audio data compressed and with the error correction codes added thereto, into code data according to a predetermined rule, a second storage 124 for storing the developed code data, and an interface 125 for reading the code data from the second storage 124, converting them into audio code images 7 which are printing data corresponding thereto, and transmitting them to the CRT printer. In this embodiment, the code converter for converting the inputted audio information into audio code images 7 are composed of the compressor 121, error correction encoder 122 and code data developer 123. This code data generating unit 120 further includes a reproducer 126 for accessing the second storage 124 and performing processes such as reverse conversion and error correction, for enabling confirmation of sound with a monitor speaker 103.

The photo processing apparatus 1 in this embodiment employs a construction capable of transmitting image information of the photographed images of film 2 acquired by the scanner 9 and stored in the first storage 111 to the photosensitive material printer 31 through the image data converter 114 and interface 125. This printer 31 can print, on the printing paper 3, both visual images 6 which are the images of film 2 and audio code images 7.

A process of making audio-coded photographs 5 with this photo processing apparatus 1 will be described next with reference to FIG. 1.

The user brings a photographed film 2 and a tape, disk, memory card or the like recording the sound to be combined to a photo processing agent, and fills in a predetermined print order card with the frame numbers of photographed images to be made into audio-coded photographs 5 and the recorded parts of the sound to be combined with the photographed images. When no media recording the sound to be combined has been brought in, an input is made directly to the audio input unit 60 from a microphone provided by the photo processing agent. The film 2 brought in is loaded into the photo processing apparatus 1 after a developing process if the film is undeveloped, or loaded as it is if already developed.

Figure 4:
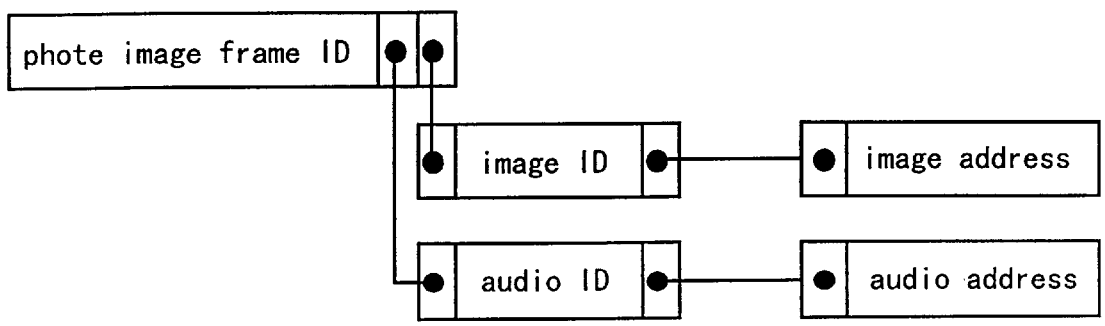
FIG. 4 is an explanatory view showing a link structure of image data and audio code data.

The film 2 loaded is transported to the projecting and exposing station 20 by a film transport mechanism 70 having a plurality of transport rollers 71 and a motor 72 for driving the transport rollers. At this time, each photographed image is scanned by the scanner 9, and acquired digital image data is stored in the first storage 111 as noted hereinbefore. At the same time, audio signals also are inputted to the controller 100 through the audio input unit 60, and stored in the second storage 124 in the form of audio code data as noted hereinbefore. Order information recorded on the print order card is applied automatically or manually to the controller 100. The central control unit 130 receives an image ID and an audio ID applied to each photographed image frame number as shown in FIG. 4. Further, the image ID is linked to the address of the pertinent image data stored in the first storage 111. The audio ID is linked to the address of the pertinent audio code data stored in the second storage 124. Such link information is generated and controlled by the central control unit 130 and stored in a link information storage 131. That is, the central control unit 130 and link information storage 131 act here as a link processing device for linking the photographed images of film 2 and audio signals corresponding thereto. Consequently, the photographed images and sound inputted to this photographic processing apparatus 1 are reliably combined in corresponding relations to be printed on the printing paper 3.

When printing the photographed images of film 2 on the printing paper 3 at the projecting and exposing station 20, the exposure control unit 110 controls the light adjustment filter 22 based on the image data acquired by the scanner 9, thereby adjusting the irradiating light of exposure light source 21 to a color balance corresponding to the color density of the images on the film 2. At the projecting and exposing station 20, the shutter 25 is operable to irradiate the film 2 with the adjusted light to print the photographed images of film 2 on the printing paper 3. At this time, the paper mask 26 is controlled to vary exposure areas on the printing paper 3. For example, unimportant regions of the photographed images are masked and processed to become a white background after development without being printed. Audio code images may be printed in such regions by the CRT printer 31. Thus, audio codes may be incorporated into photographs of an ordinary print size.

The printing paper 3 printed is successively transported by a printing paper transport mechanism 80. This printing paper transport mechanism 80 includes the above-mentioned loop forming section 40. The loop forming section 40 has transport rollers 81 and 82 for transporting the printing paper 3, and a motor 84 for driving the transport roller 81. Though not shown in the drawing, a flap is disposed between the roller 81 upstream with respect to a printing paper transport direction and the roller 82 downstream with respect to the printing paper transport direction, which is switchable between a position for linearly guiding the printing paper 3 between the transport rollers 81 and 82, and a position for allowing the printing paper 3 to form a loop as shown in FIG. 1. By forming a loop of printing paper 3, transport processes may be performed independently for the projecting and exposing station 20 and for the photosensitive material CRT printer 31, with an optimal transport speed set for each.

Where the photographed images of film 2 are printed on the printing paper 3 not at the projecting and exposing station 20 but at the CRT printer 31, the film 2 scanned by the scanner 9 is not used at the projecting and exposing station 20, and therefore is drawn out straight. The photographed images made into digital images are printed on the printing paper 3 by the CRT printer 31 after the conversion processes at the image data converter 114 and at the interface 125 for the CRT printer 31. In that case, data of visual images of the photographed images and data of the audio code images may be composed beforehand in the controller 100 and transmitted to the CRT printer 31 as one printing data, or may be printed separately as two printing data by moving the printing paper 3 a predetermined amount between prints. Where the data are composed beforehand in the controller 100, there is of course a degree of freedom for effecting various digital processes in time of composition.

Though not shown in the drawing, the developing station 50 includes a plurality of tanks filled with treating liquids for developing the printing paper 3 after a printing process. The printing paper 3 is developed by passing successively through the plurality of tanks. A transport control of printing paper 3 through the developing station 50, and controls of the motor 72 of the film transport mechanism and the motors 84 and 85 of printing paper transport mechanism 80, are centrally controlled by the controller 100.

Figure 5:
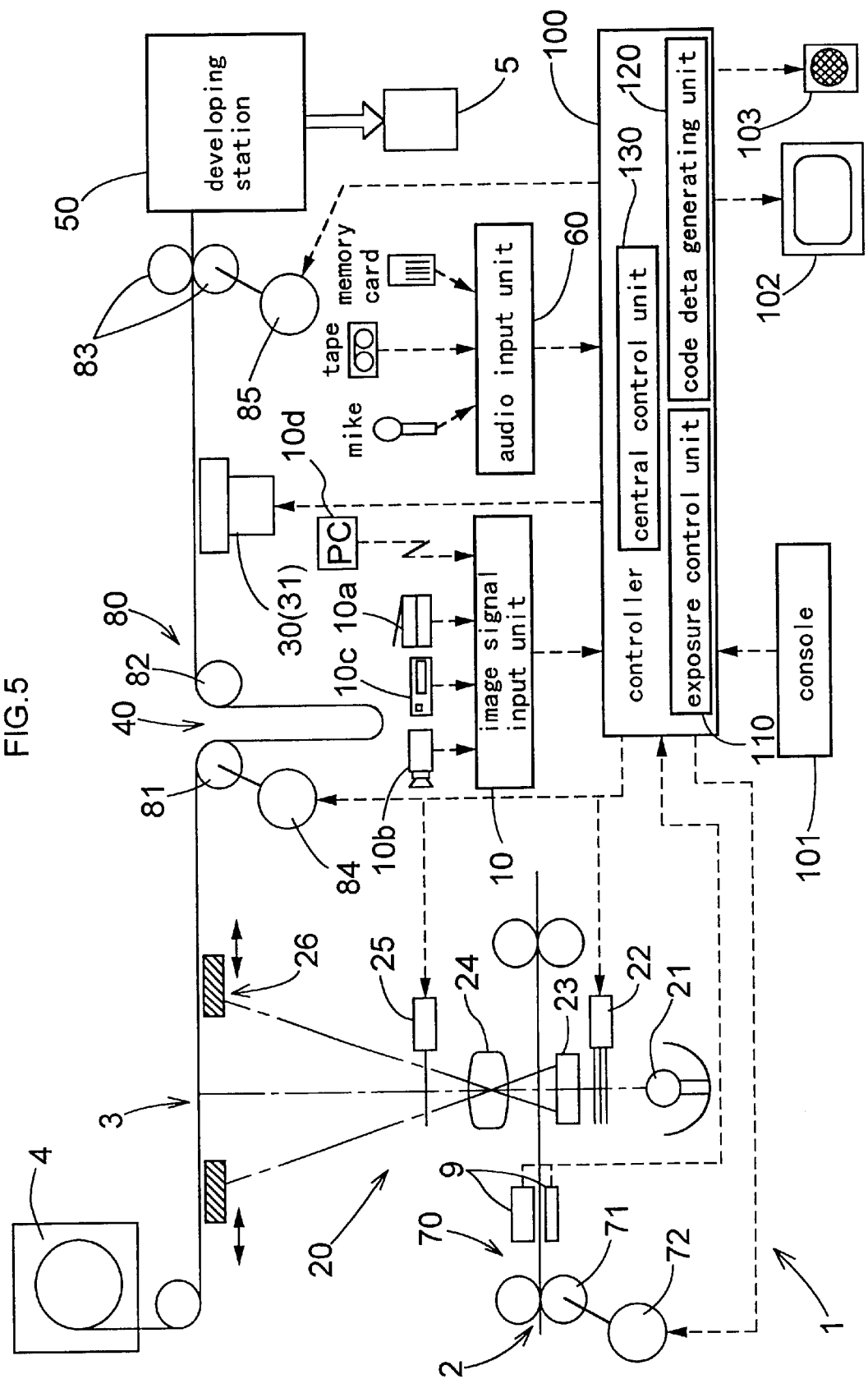
FIG. 5 is a block diagram showing an outline of another embodiment of image processing apparatus according to this invention.

The photo processing apparatus 1 shown in FIG. 5 is different from the photo processing apparatus 1 shown in FIG. 1 in that the controller 100 has an image signal input unit 10 for receiving image data from a flat-bed scanner 10a which is one example of devices for acquiring digital images from photographic prints. This provision is made in order to make new audio-coded photographs 5 by combining photographic prints with audio code images even when the user brings the photograph prints instead of a photographic film 2. Image data of the photograph prints acquired with the flat-bed scanner 10 are stored in the first storage 111 of exposure control unit 110. The image data, after being processed by the image data converter 114 and interface 125, are printed on the printing paper 3 with audio code images by the photosensitive material printer 31 such as the CRT printer or PLZT printer, developed at the developing station 50, and discharged as audio-coded photographs 5. The image signal input unit 10 has an interface for receiving image data from digital photographing devices such as a video movie camera 10b and a digital still camera 10c and a computer 10d capable of making or editing images. Thus, the controller 100 receives image data from various media. Though not shown in the drawing, the controller 100 may of course receive image data and audio data through telecommunication lines.

Figure 6:
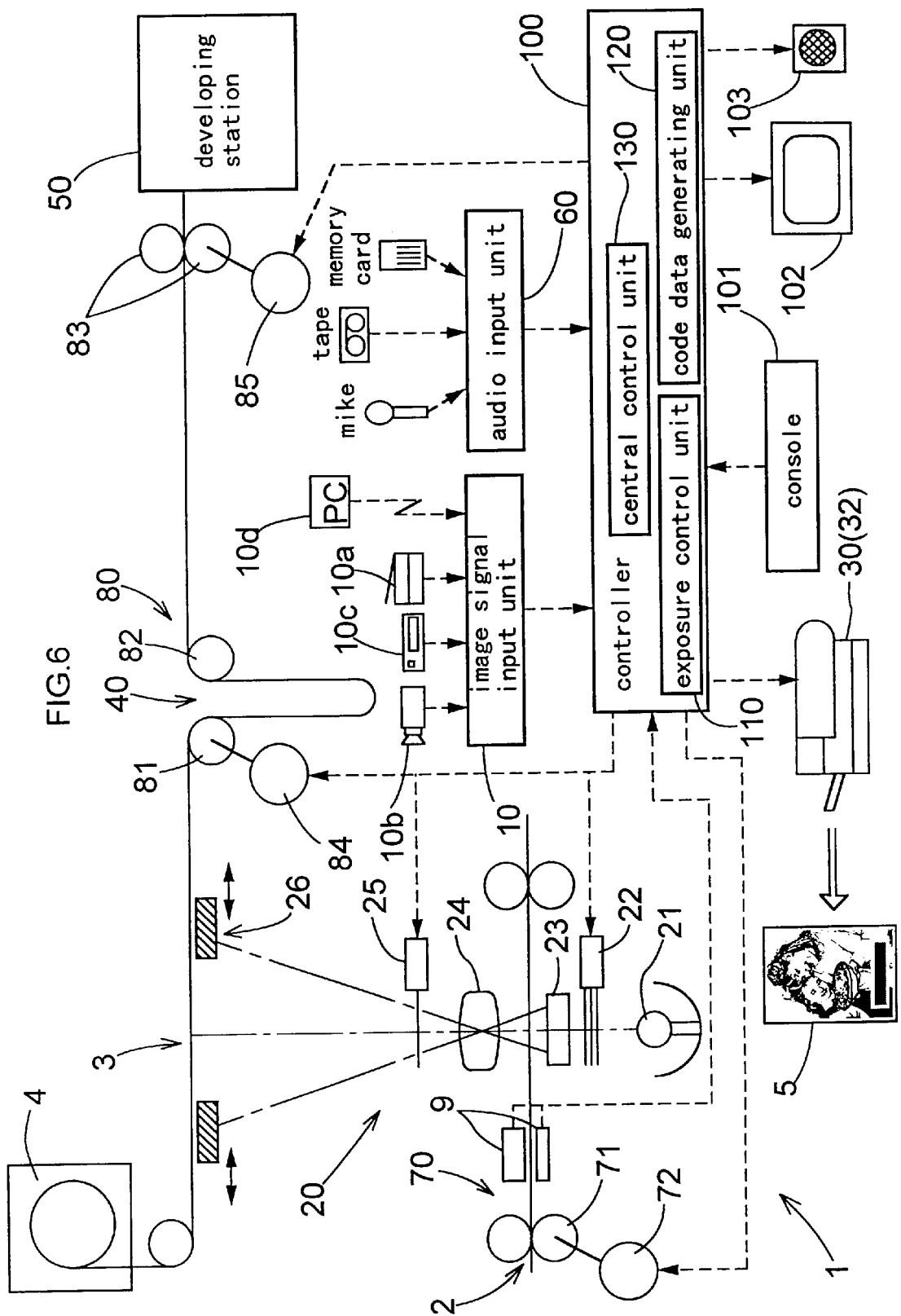
FIG. 6 is a block diagram showing an outline of a further embodiment of image processing apparatus according to this invention.

The photo processing apparatus 1 shown in FIG. 6 is a modification of the apparatus shown in FIG. 5, which employs a non-photosensitive material printer 32 such as a thermal printer or an ink jet printer instead of the photosensitive material printer 31 to form audio-coded photographs 5 not on the printing paper 3 but on heat-sensitive paper, coated paper or the like. A thermal printer in particular is used to make seal prints besides index prints in ordinary photo processing, and may not only be used as it is for printing out audio-coded photographs 5 but provide an additional advantage that the printed audio-coded photographs may readily stick to an album or surfaces of other articles by using seal paper.

Figure 7:
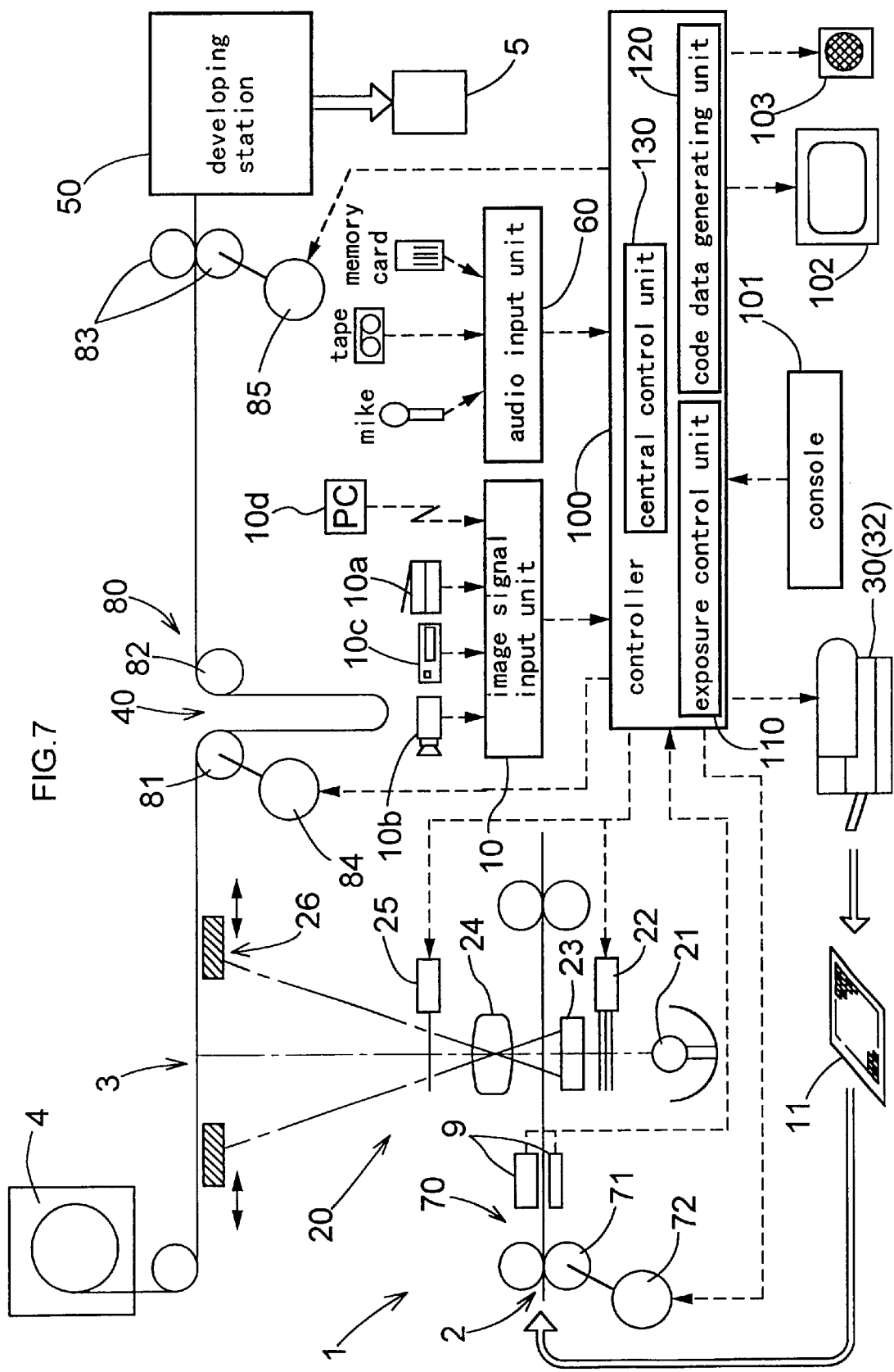
FIG. 7 is a block diagram showing an outline of a further embodiment of image processing apparatus according to this invention.

The photographic processing apparatus 1 shown in FIG. 7 is different from the photo processing apparatus 1 shown in FIG. 1 in that a non-photosensitive material printer 32 such as a laser beam printer or an ink jet printer is used as printing device 30 for printing out audio code images at a high enlargement ratio not on the printing paper 3 but on transparent film 11. Using the transparent film 11 having the enlarged audio code images formed thereon, the projecting and exposing station 20 prints the audio code images in an appropriately reduced size on the printing paper 3. Audio code images of increased minuteness may be formed by changing the printing lens 24 of projecting and exposing station 20 for one of high precision.

In the embodiments of photo processing apparatus 1 shown in FIGS. 5, 6 and 7, image information to be processed comprises digital images made or edited by the computer 10d using image generating software, digital images supplied from image acquiring devices such as a scanner and a digital camera, and digital images read from recording media such as FDs and CD-Rs. The images may be outputted by a hard copy device such as a printer as audio-coded photographs by combining them with audio code images based on audio information acquired from a microphone, cassette tapes or CDs. In this case, corresponding image information and audio information must be linked in the photo processing apparatus 1. For this purpose, as described hereinbefore, the link processing device for generating and controlling link information is provided by the central control unit 130 and link information storage 131.

Operation of the image processing apparatus 1 according to this invention constructed with emphasis placed on the function of the link processing device will be described hereinafter, along with several embodiments, with reference to FIGS. 8 through 16. Here, the image signal input unit 10 has an image input processor 210, an image editor 212 and an image selector 214. The audio input unit 60 has an audio input processor 218, an audio editor 220 and an audio selector 222. Reproduction of inputted sound and monitoring of inputted images are carried out through the monitor 102 and speaker 103 by operating a user input setter 216 formed in the console 101. Further, the link processing device provided by the central control unit 130 and link information storage 131 in the foregoing description is shown here as a link processing unit 130a expressed by a collection functional blocks such as an ID information provider 230 and a link information setter 236. Further, the code data generating unit 120 is shown as a code converter 242 having an audio data compressor/encoder 238 constructed with a suitable one selected from known coding techniques such as waveform coding, analytico-synthetic coding and so on, and an audio code image generator 240 for developing the coded audio code data into two-dimensional code images. A synthesizer 140 for synthesizing the visual images stored in an image data storage 232 and the audio code images stored in an audio code image storage 244 includes a visual/audio code image layout editor 234 and a visual/audio code image synthesizer 246, combines the visual images and the audio code images in desired layouts based on the link information set by the link processing unit 130a, and transmits them to the printing device 30.

The embodiment shown in FIG. 8 will be described first with reference to the flow chart of FIG. 9.

Image information is inputted from a film scanner, a scanner, a digital camera, a video camera, an FD (floppy disk), a PC (personal computer) or the like to the image input processor 210 (#1). The image information is transmitted to the image editor 212 where editing processes such as color tone/gradation conversion and enlargement/reduction are performed through controls from the user input setter 216 while images are confirmed on the monitor 102 (#2). Edited images are transmitted to the image selector 214 where an image is selected for printing.

On the other hand, audio information is inputted from a microphone, a cassette tape-recorder, a CD (compact disk), a digital voice recorder or the like to the audio input processor 218 (#1). The audio information is transmitted to the audio editor 220 where audio editing processes are performed through controls from the user input setter 216 while sound is confirmed with the speaker 103 (#3). Edited audio data is transmitted to the audio selector 222 where a sound is selected for linking to the image selected by the image selector 214 (#6).

Figures 10, 11:
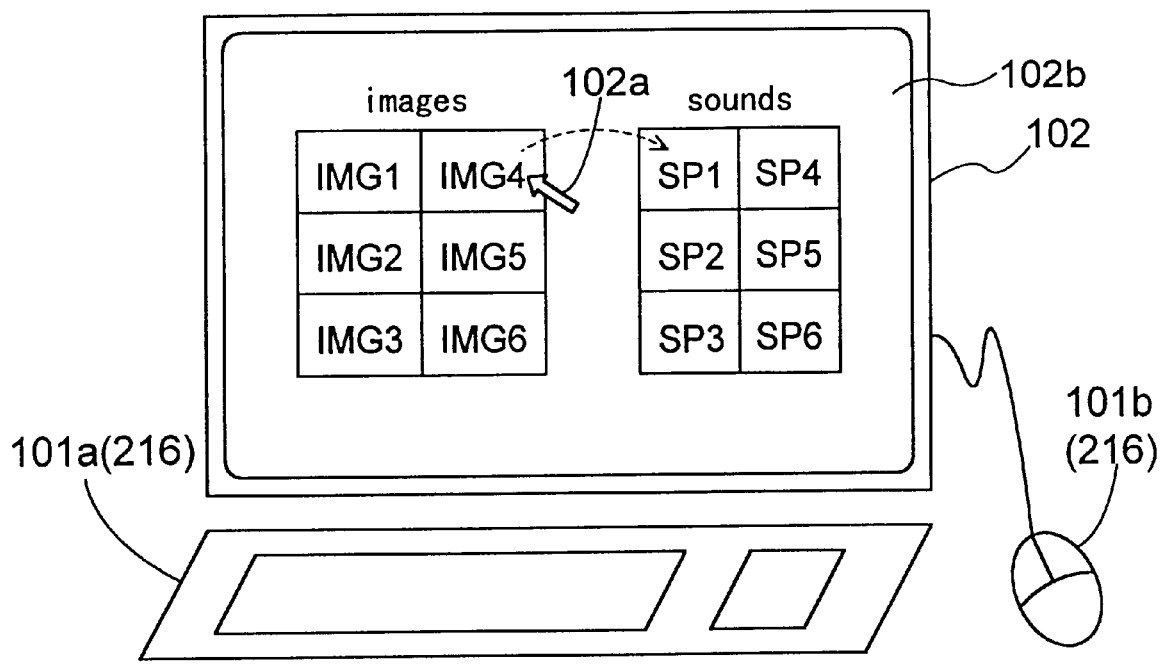
FIG. 10 is a schematic view showing a monitor screen of the image processing apparatus according to this invention.
FIG. 11 is a schematic view illustrating an image ID, image information with the image ID and audio information with the image ID.

The image selector 214 and audio selector 222 will be described here with reference to FIG. 10. In this embodiment, the image monitor 102 has a monitor screen 102b as shown in FIG. 10. The user input setter 216 includes a personal computer's keyboard 101a, mouse 101b and their interface circuits. The user, while looking at a plurality of images displayed on the monitor 102, selects an image to be printed and a sound to be converted into an audio code by using a cursor 102a on the screen interlocked to the mouse 101b. As a method of selection, an image is selected by placing the cursor on the image to be printed (IMG4 in FIG. 10) and clicking on it (#4). Further, a sound to be linked to the image is selected by dragging the cursor to an audio symbol (SP1 in FIG. 10) and dropping it there (#6). The audio symbols displayed on the screen are only symbol images showing, for example, the names, numbers or the like of tunes for distinguishing sounds. Thus, for confirming audio contents, a desired audio symbol on the monitor screen is designated with the cursor and double-clicked to reproduce an actual sound from the speaker 103.

The selected image data is transmitted to the ID information provider 230 where image ID information supplied by the ID information supplier 228 is applied by the image ID information provider 226 (#5). As shown in FIG. 10, actual image ID information is set by an input made from the keyboard 101a by the user. Image ID information D1 applied to the image by the image ID information provider 226 is transmitted to the link information setter 236. Image information D2 to which this image ID is applied as a header is once stored in the image data storage 232. As shown in FIG. 11(a), image ID information D1, for example, includes an image serial No., an individual number, an input mode number, an identification number and a frame number. The individual number comprises customer's telephone number and date of birth. The input mode number identifies the medium serving as the source of the image, which is a sign indicating a photographic film, a photographic print or a digital camera, for example. The identification number corresponds to a film number including a lab shop number in the case of a photographic film, or an ID number or volume name in the case of a storage medium such as Smart Media. As shown in FIG. 11(b), image information D2 with an image ID has the above image ID allocated to the header, and the image data in an appropriate format (JPEG, GIF, PICT or the like) to a data section.

On the other hand, the audio information selected by the audio selector 222 for combination with a particular image is transmitted to the link information setter 236. The link information setter 236 adds an image ID of the image to be combined received from the image ID information provider 226, as a header of this audio information and as link information (#7). FIG. 11(c) shows a data format of audio information D3 with link information. Audio information D3 with link information is transmitted to the audio data compressor/encoder 238 where only the audio data is compressed. Subsequently, at the audio code image generator 240, the compressed audio data and the link information are converted into optically readable audio code images (#8). The data of the audio code image is stored once in the audio code image storage 244.

The image data stored in the image data storage 232 and the audio code image stored in the audio code image storage 244 to be linked to this image are taken into the visual/audio code image layout editor 234, relying on the link information applied as noted above, where a layout editing process is performed for the visual image and audio code image (#9). In an actual layout editing process, a layout editing screen is displayed on the screen 102b of monitor 102 shown in FIG. 10, and a layout editing process is performed for the visual image and audio code image on instructions given with the cursor. For example, after the editing process, a display is made of the visual and audio code images combined and laid out as desired. When, in the layout editing, the visual and audio code images to be printed are determined to be NG, the operation returns to the process at the image editor 212 or audio code image generator 240 to carry out a necessary process again. When, for example, the audio code image exceeds a printable length, a revision is made to separate it into two parts for a two-tier arrangement. Further, by designating an audio code image displayed on the monitor screen 102b with a mouse 101b and double-clicking on it, a corresponding audio source is read from a temporary storage medium not shown, and outputted from the speaker 103.

The visual/audio code image synthesizer 246, upon receipt of layout information from the visual/audio code image layout editor 234, transmits a request signal to each of the image data storage 232 and audio code image storage 244, and receives the corresponding image data and audio code image data obtained from the layout information and link information. The image data and audio code image data received are integrated to synthesize print image data. The print image data is transmitted to the printing device 30 to print a composite image (#10).

The visual/audio code image layout editor 234 may perform a layout editing process by first taking in the audio code image stored in the audio code image storage 244 and, based on the link information extracted from the audio code image, taking in the image data having the link information agreeing with the extracted link information from among the image data stored in the image data storage 232, or may perform a layout editing process by first taking in the image data stored in the image data storage 232 and, based on the link information extracted from the image data, taking in the audio code image having the link information agreeing with the extracted link information from among the audio code images stored in the audio code image storage 244.

FIG. 12 shows new year's greetings postcards with a photograph as an example of audio-coded recording media printed out. FIG. 12(a) shows the back of a new year's greetings postcard with an audio code image 7 disposed in a blank region not recording the photograph or characters. FIG. 12(b) shows the back of a new year's greetings postcard with an audio code image 7 disposed in a masking region formed with a white undercoat seal in a visual image recording region where the photograph and characters are recorded. FIG. 12(c) shows the front of a new year's greetings postcard with an audio code image 7 printed above the new year's gift number, visual images such as the photograph and characters being printed on the back. For this purpose, the visual/audio code image layout editor 234 and visual/audio code image synthesizer 246 have also functions to develop the visual and audio code images on a plurality of printing sheets.

Further, FIG. 12(d) shows the back of a new year's greetings postcard with an audio code image 7 superimposed on the image in a visual image recording region as a stealth type code invisible under visible light. A material used for recording the stealth type audio code image may be a fluorescent material which is transparent under visible light and emits light when irradiated with ultraviolet light.

Figure 8:
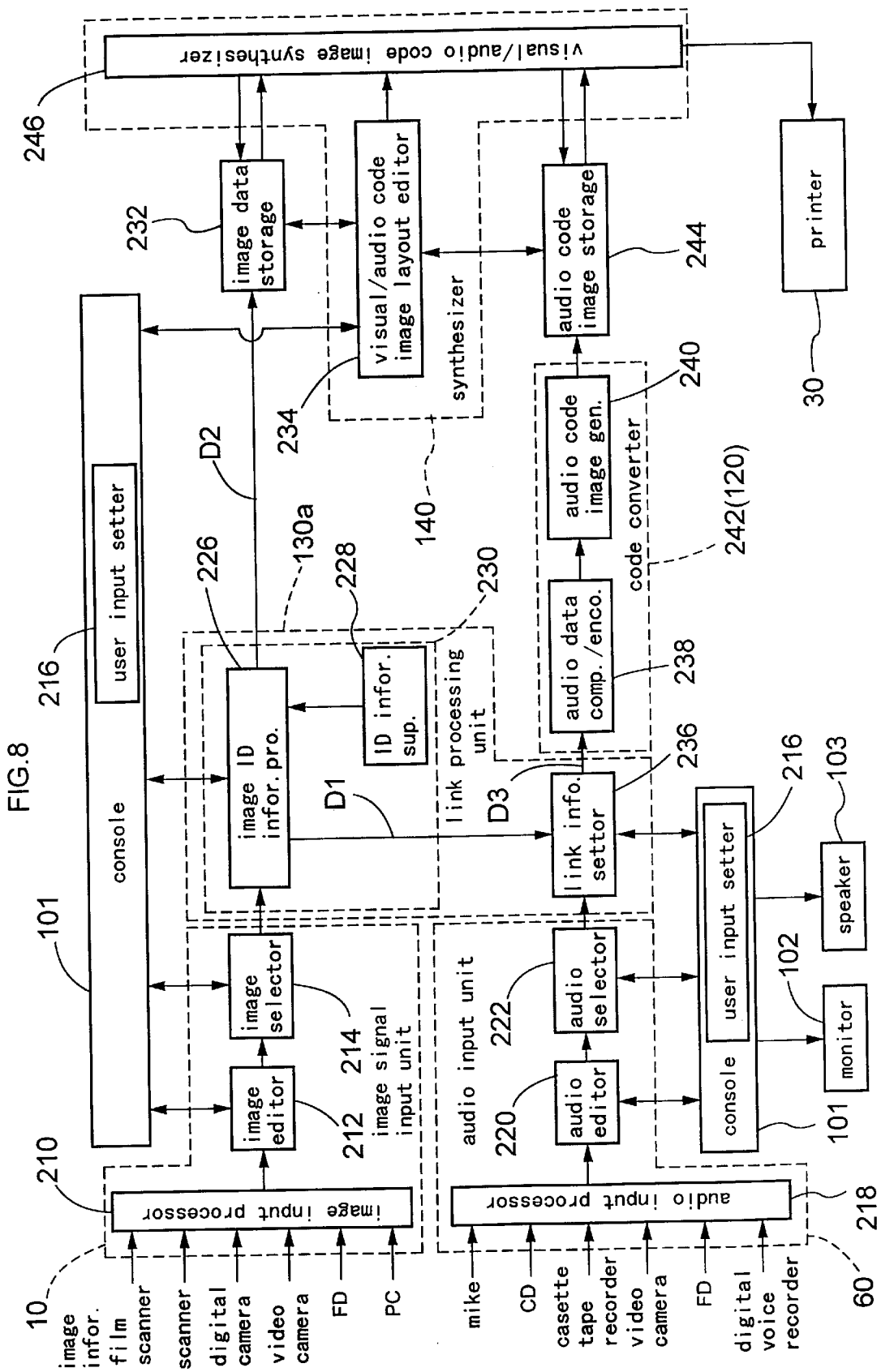
FIG. 8 is a block diagram of an embodiment of image processing apparatus of this invention constructed with emphasis placed on the function of a link processing device.
Figure 9:
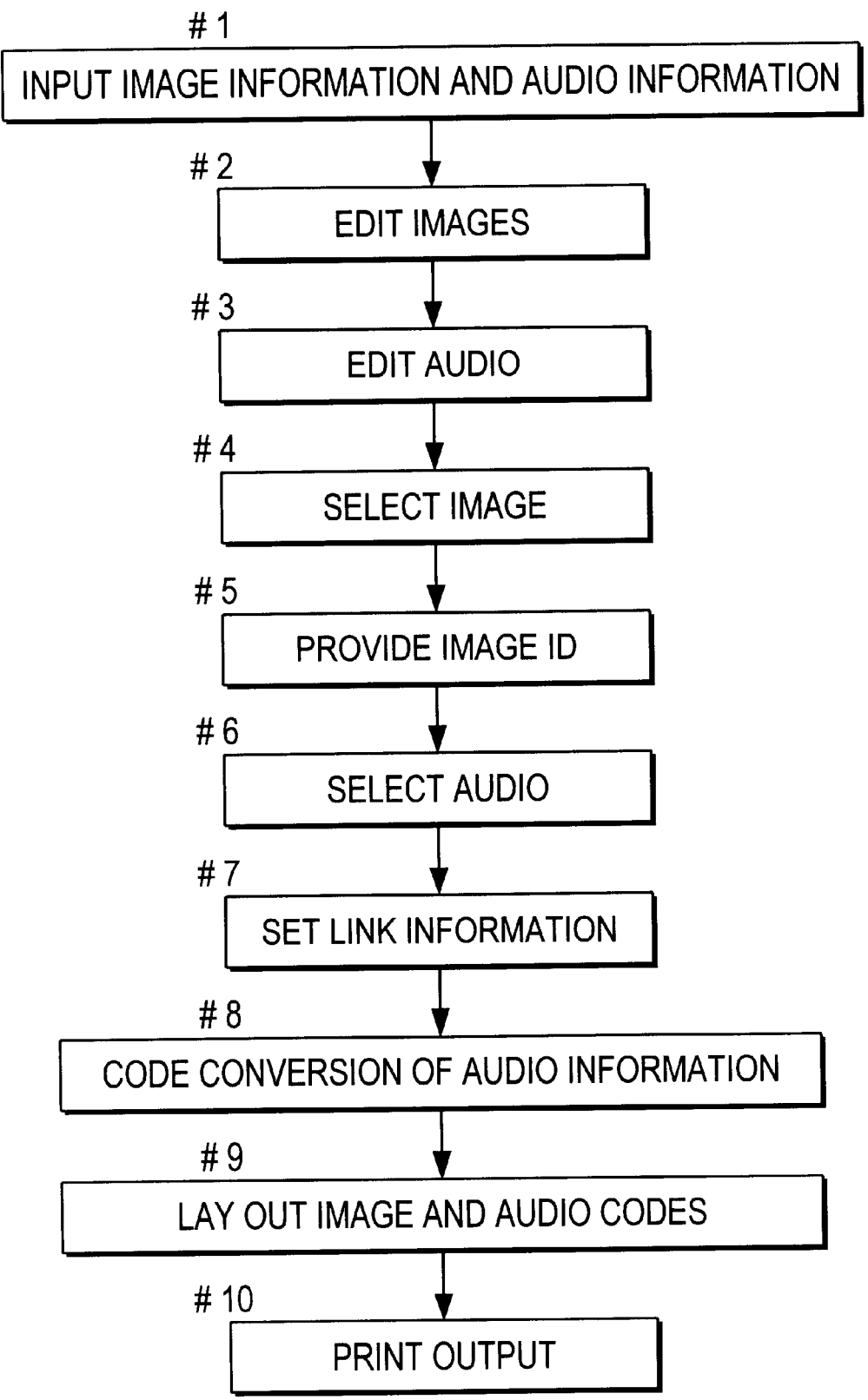
FIG. 9 is a flow chart showing a processing sequence of the image processing apparatus of FIG. 8.
Figure 13:
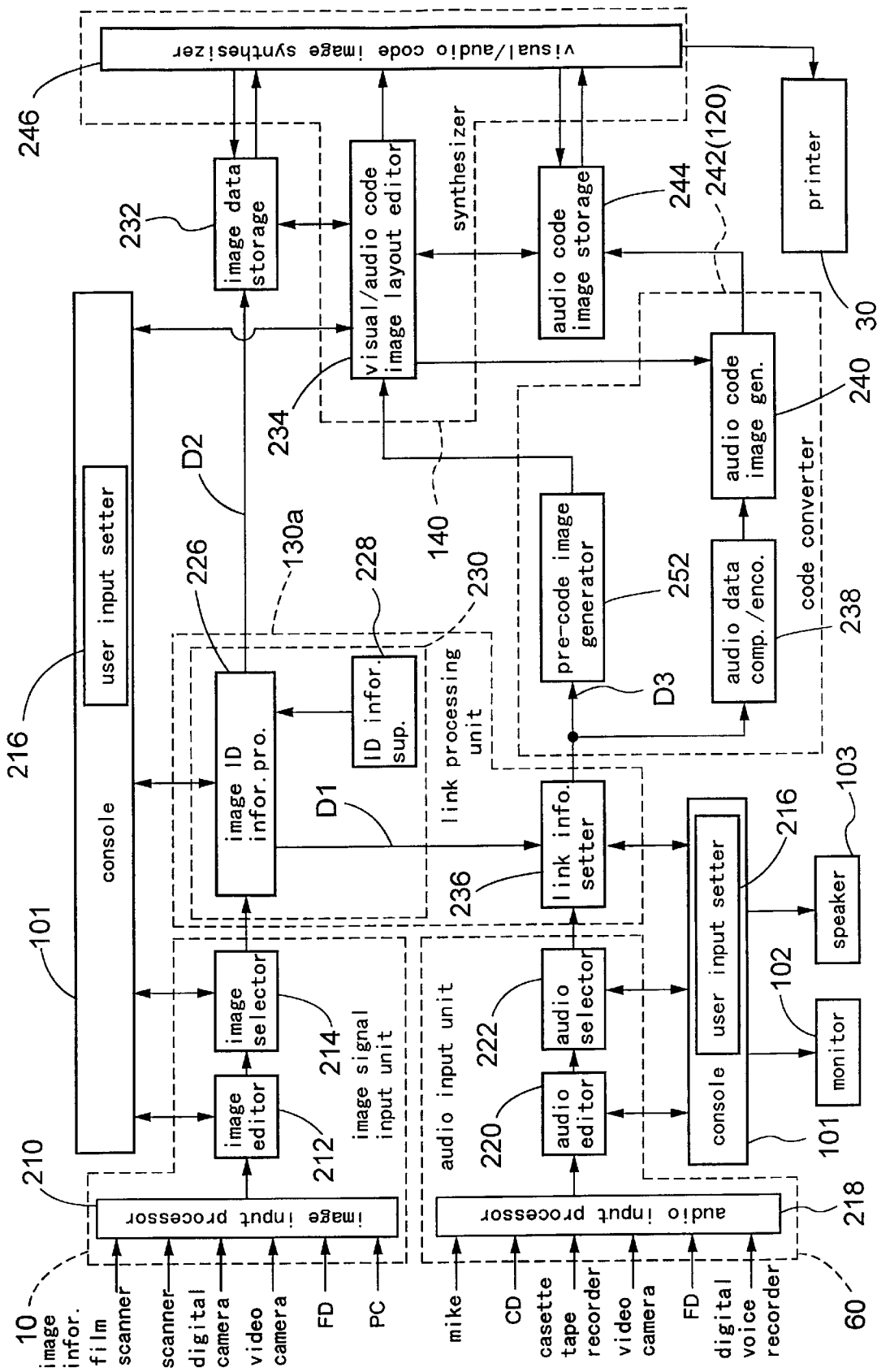
FIG. 13 is a block diagram of another embodiment of image processing apparatus of this invention constructed with emphasis placed on the function of the link processing device.

The embodiment shown in FIG. 13 is different from the embodiment shown in FIG. 8 in that the code converter 242 includes a pre-code image generator 252. The pre-code image generator 252 computes a size (outside dimensions) of the audio code image for audio information to be combined with an image, and transmits it to the visual/audio code image layout editor 234. The visual/audio image layout editor 234 performs a layout editing process for the visual image and the audio code image by using the size of the audio code image computed. Subsequently, layout information is transmitted to the audio code image generator 240. Since the size of the audio code image to be used is known, in the layout editing operation, the visual image and audio code image may be arranged in a layout without an unused blank. The audio code image may be divided automatically as necessary. The layout process may be performed efficiently since a layout may be made through the pre-code image generation which requires only a short processing time without a time-consuming audio code image generation.

After completing such layout editing, the audio information is coded. The audio code image generator 240 combines the audio code data and the link information including the layout information, and encodes and turns the information into an image as one audio code data. Since the printed audio code image has the layout information, a layout editing operation may be omitted by reading this layout information in the event of a request for duplicates made from the print again or for additional prints of the audio photograph.

Figure 14:
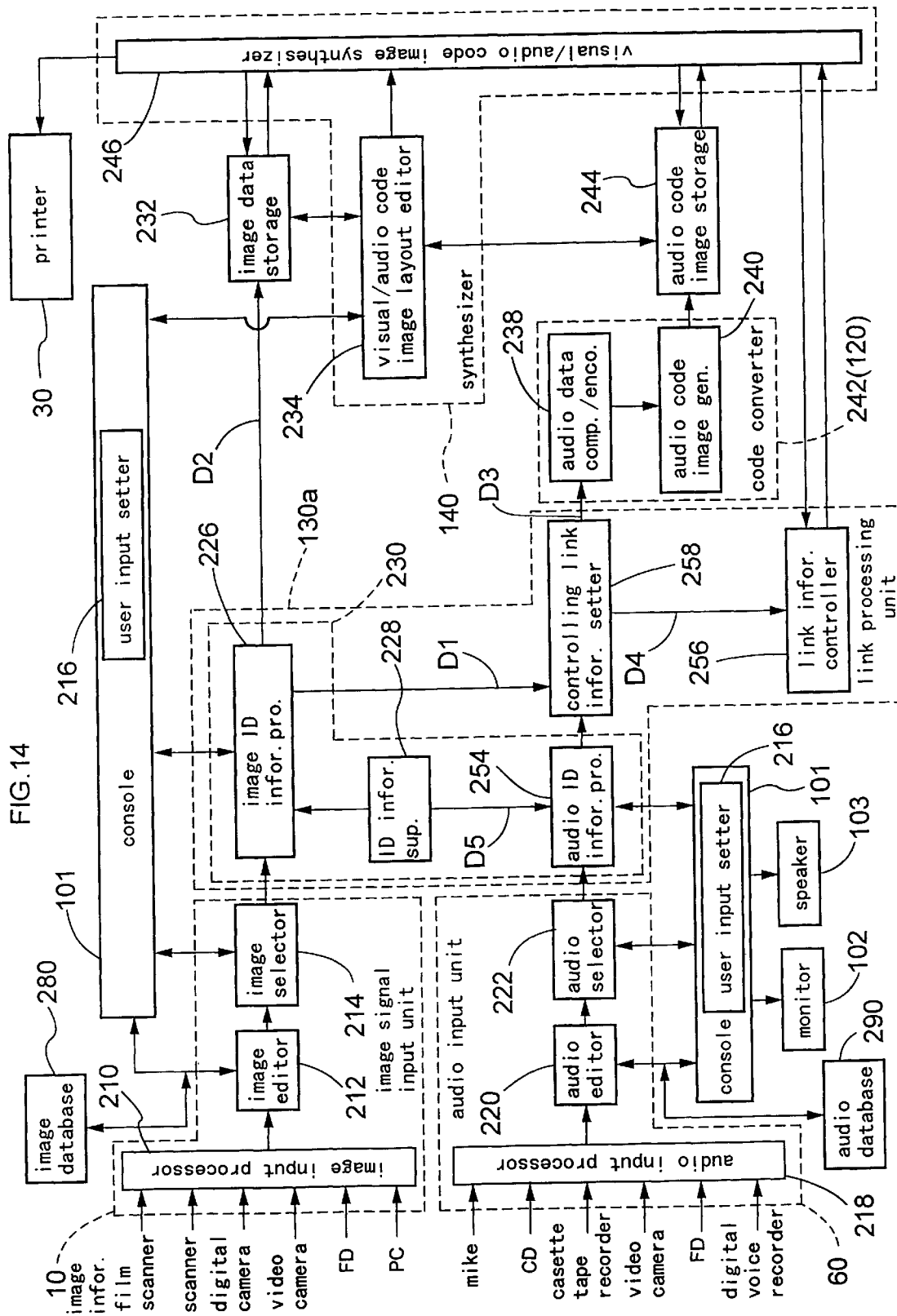
FIG. 14 is a block diagram of a further embodiment of image processing apparatus of this invention constructed with emphasis placed on the function of the link processing device.
Figure 15:
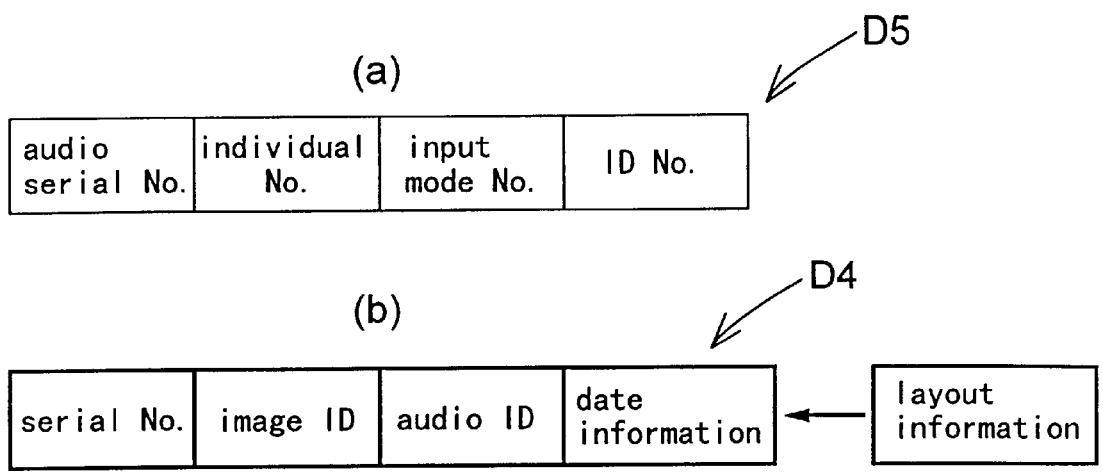
FIG. 15 is a schematic view illustrating an audio ID and link information.
Figure 16:
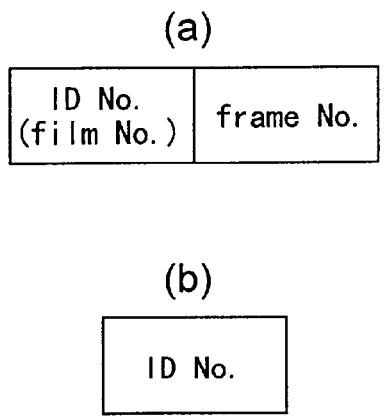
FIG. 16 is a schematic view illustrating a simple image ID and audio ID.

The embodiment shown in FIG. 14 is different from the embodiment shown in FIG. 8 in that the link processing device 130a additionally includes an audio ID information provider 254 for providing audio ID information, and a link information controller 256 for controlling link information, and that a controlling link information setter 258 is provided in place of the link information setter 236. The audio ID information provider 254 applies audio ID information supplied by the ID information supplier 228 to selected audio information. As shown in FIG. 15(a), the audio ID is in a data format similar to the above-mentioned image ID (FIG. 11(b)). The input mode number is a sign showing an audio source medium such as postrecording, cassette, MD or FD.

The ID information supplier 228, image ID information provider 226 and audio ID information provider 254 constitute the ID information provider 230. Set image ID and audio ID are integrated by the controlling link information setter 258 to become controlling link information. FIG. 15(b) shows a data format of the controlling link information, which includes a serial number acting as an ID of an audio-coded recording medium to be made, an image ID, an audio ID and date information. Further, this link information may have, added thereto through the controlling link information setter 258, layout information showing a layout of the visual image and audio code image determined by the visual/audio image layout editor 234.

The controlling link information generated by the controlling link information setter 258 is transmitted to the link information controller 256. The link information controller 256 controls the controlling link information by database. The link information controller 256 transmits the controlling link information in response to a request signal from the visual/audio code image synthesizer 246. The visual/audio code image synthesizer 246 transmits a request signal relating to the image data to be printed to the image data storage 232 to receive the image data, and transmits a request signal relating to the audio code image to the audio code image storage 244 to receive the audio code image. The image data and audio code image data received are integrated to generate print image data. In this construction, a process is carried out efficiently for outputting prints from a plurality of image data and audio code image stored and accumulated. Thus, as a result of the controlling link information being used as image and audio source address information, use may be made freely as image source not only of what is inputted from the image input processor 210 each time, but of data read from an image database 280 storing numerous images and an audio data base 290 storing numerous sounds.

The embodiment according to FIG. 8 is described with the construction which uses the image ID for link information, but it is possible to use the audio ID for link information. In an embodiment which limits the image source to photographic films, the image ID used as link information may include a film number serving as an identification number and a frame number identifying an image as shown in FIG. 16(a). The audio ID may include only an identification number.

In the foregoing embodiments, a CRT printer or PLZT printer is used as the printing device 30 for forming visual images and audio code images on the printing paper 3. A liquid crystal printer, fluorescent tube printer or laser exposure heat developing device may be employed. In this case, the photo processing apparatus 1 may be a completely digital photo printer with the projecting and exposing device 20 omitted therefrom.

Various techniques known per se may be used as the code data generating unit 120, i.e. code converter 242, for turning audio signals into optically readable code images. It is possible to divert, for example, the technique of the information recording and reproduction system using dot codes which is described in detail in Patent Laying-Open Publication H6-231466. It is also possible to divert the technique of two-dimensional bar codes of the stack type or matrix type.

Figure 17:
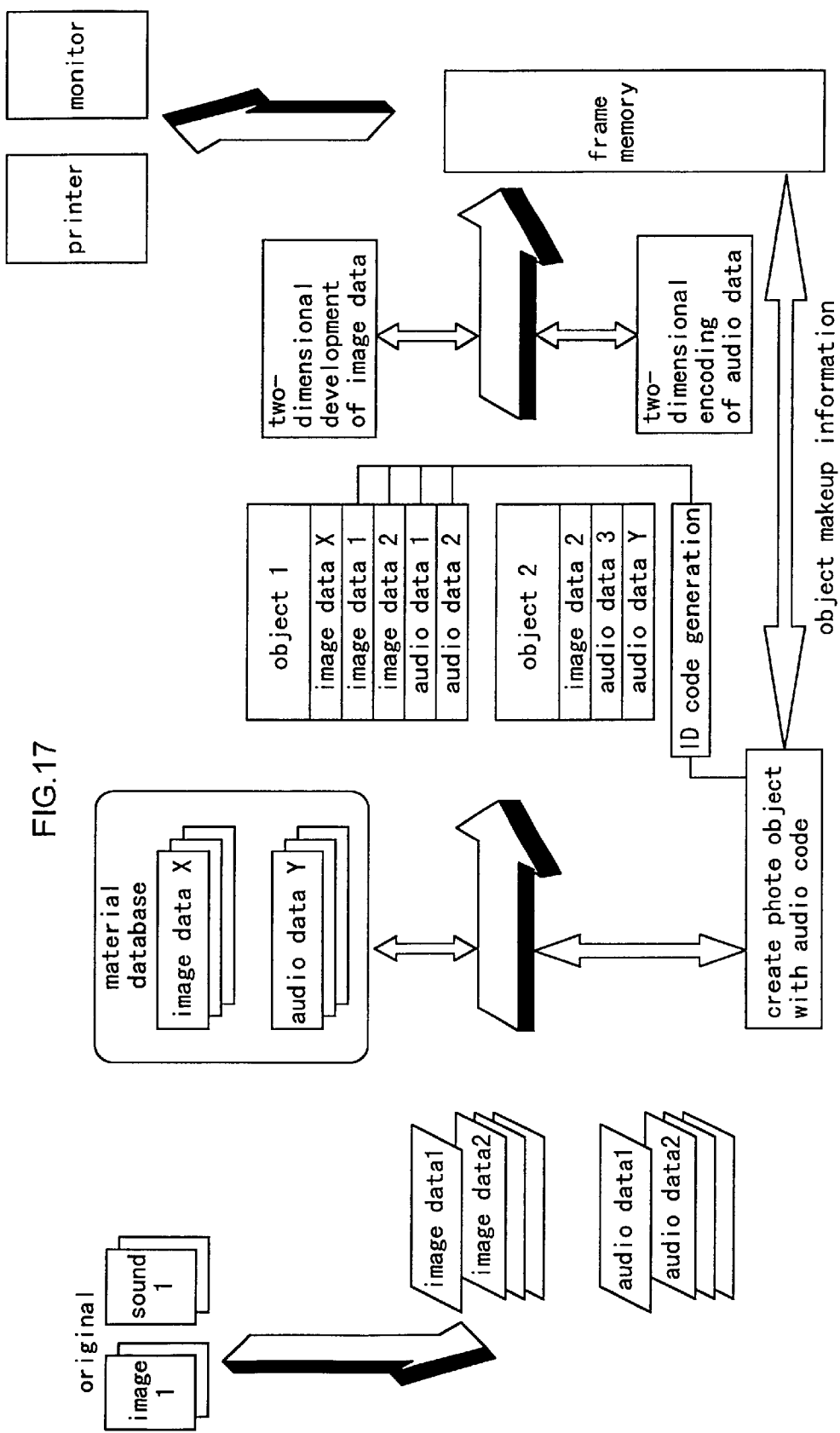
FIG. 17 is an explanatory view showing a flow of making photographs with audio code images with a photograph making apparatus according to this invention.

Audio-coded recording media and a flow of operation for making the recording media in a different embodiment of this invention will be described next with reference to FIGS. 17 through 20. FIG. 17 is a view showing a flow of making audio-coded photographs with an audio-coded photograph making apparatus in this embodiment.

A customer who orders audio-coded photographs brings image recording media such as photographs or negative films which are a source of still images, and audio recording media such as cassette tapes, serving as image information source and audio information source, or sound and image recording media such as a digital camera or digital video recording both sound and images, and indicates which images and sound should be combined. The sound and images in the recording media received are encoded as necessary, and temporarily stored in a storage medium such as a hard disk as image data and audio data in a format processable by the apparatus. This storage medium stores not only the image data and audio data received from the customer but data of various landscapes, illustrations, environmental sounds and so on. The customer may select these landscapes, illustrations and environmental sounds for incorporation into the audio-coded recording media.

The operator combines the image data and audio data temporarily stored in the storage medium as required by the customer, and creates audio-coded photographic objects. Each audio-coded photographic object corresponds to one audio-coded photograph. One audio-coded photographic object includes at least one image data and at least one audio data, but actually has only pointers indicating links of the data.

Figure 18:
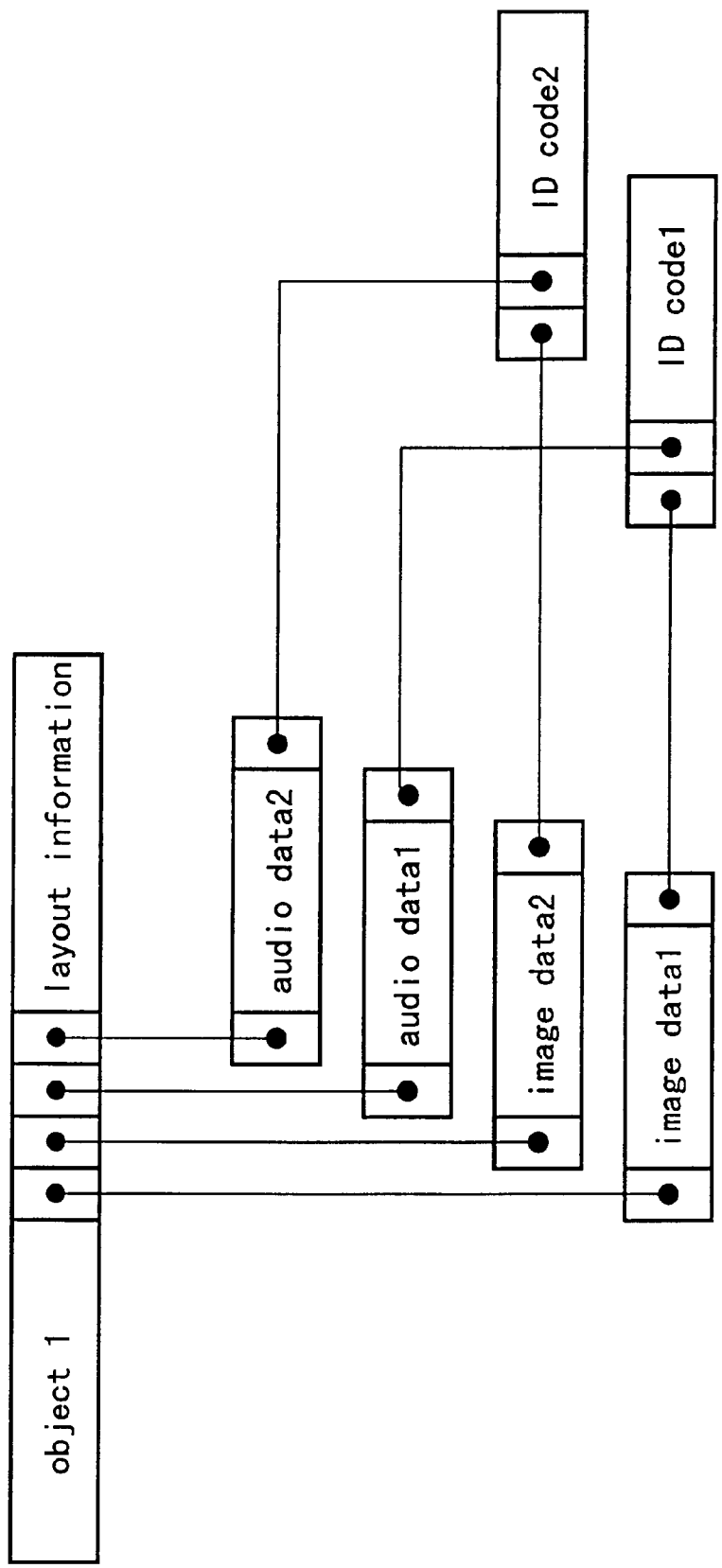
FIG. 18 is a schematic view showing a linked relationship among image data, audio data and ID code in one object.

Once predetermined image data and audio data are combined, an ID code acting as a recognition sign showing mutual correspondence is applied to the image data and audio data as link information. This ID code is generated for each combination of image data and audio data in one object and applied commonly thereto. The link relation between these is schematically shown in FIG. 18. As the ID code, a mere ordinal number may be used, or a character string descriptive of the content of the audio code may be used. Depending on circumstances, a line linking the corresponding image data and audio data may be employed as the recognition sign in place of the ID code. Further, a mark emitting a sound (audio code or the like) or light (fluorescence or the like) may be used as the recognition sign. In any case, any form is acceptable as long as the sign can show a mutual correspondence between each still image and each audio code.

Figure 19:
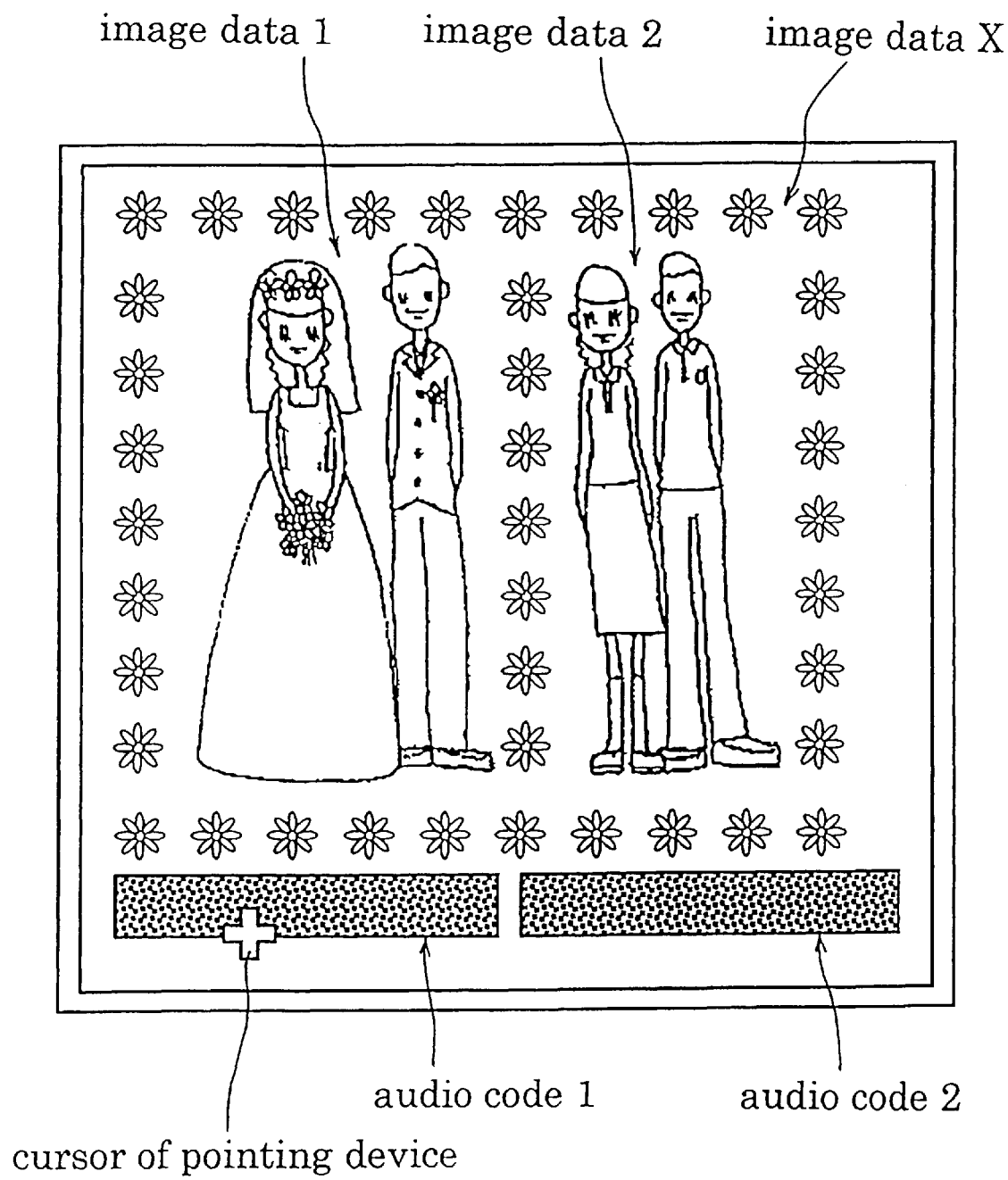
FIG. 19 is a schematic view showing an audio-coded photograph.

Once an audio-coded photographic object is determined, the image data is put to a two-dimensional development and the audio data developed into a two-dimensional code based on its object makeup information. The ID code also is developed into an image. These are combined and stored in a frame memory. A composite image to be ultimately printed as an audio-coded photograph by using the composite data stored in the frame memory is displayed on a monitor screen as shown in FIG. 19.

The operator may look at the monitor screen and check visual images and a layout of the still images and audio code images and may confirm combinations of the still images and audio codes through the ID codes for the predetermined audio-coded photograph. The contents of the audio codes, i.e. the sounds themselves, cannot be confirmed on the monitor screen. To confirm the sounds of the audio codes, a mouse or the like is clicked on the audio codes displayed or frames representing the audio codes on the screen, or ID codes are key-inputted from a console. The sound corresponding to the audio code selected may be produced from a speaker by the following two methods.

In one method of hearing the sound, a storage position of the audio data corresponding to the clicked or selected audio code is located by using object makeup information. This audio data is put to an appropriate decoding process, and transmitted to the speaker to produce the sound. This method is based on the precondition that the audio data corresponding to the audio code is stored in an accessible form. In the other method used where the above precondition is not satisfied, the two-dimensional code corresponding to the selected audio code is taken out of the frame memory as separated from the still image data. The two-dimensional audio code is put to a reverse conversion to restore the original audio data. The audio data restored is put to an appropriate decoding process, and transmitted to the speaker to produce the sound.

The composite image confirmed on the monitor screen is transmitted from the frame memory to a silver salt type printer or a thermal printer to output an audio-coded photograph. The audio-coded photograph finished in this way is passed on to the customer. The customer may hear the sound by scanning the audio codes with a known audio code reading scanner.

One example of apparatus for making audio-coded photographs in the above flow of operation will be described with reference to the functional block diagram shown in FIG. 20.

An input unit 300 is a generic term including a flat-bed scanner for acquiring information from still images such as photographs, posters and so on, a film scanner for acquiring information from still images such as of negative films, a special reader for reading information from a digital camera and digital video, and various audio players for using cassette tapes, CDs and so on as input sources. An image encoder 311 is operable to convert inputted image information into a digital format for processing in this apparatus. An audio encoder 312 is operable to convert inputted audio information into the digital format for processing in this apparatus. A storage 320 stores image data and audio data converted by the encoders 311 and 312. The storage 320, while temporarily storing the data brought in by customers, also stores, until deleted forcibly, image data and audio data as a stock of materials available for selection by the customers as they wish.

An object generator 330 selectively reads image data and audio data from the storage 320 by using file names or the like, and generates an audio-coded photographic object to make an audio-coded photograph. Each time a combination of image data and audio data is determined, an ID code acting as a recognition sign for that combination is applied by an ID code generator which is one example of recognition sign provider. Thus, as seen from FIGS. 17 and 18, this audio-coded object includes image data, audio data and ID codes. The makeup pattern of the object determined is maintained in the form of object makeup information by an object makeup information controller 331.

This information must be developed in a frame memory 350 in order to display on a monitor 360 or output from a printer 370 an audio-coded photograph based on the object determined. For this purpose, the image data of the object determined is developed by an image data two-dimensional developer 341, and transmitted to the frame memory 350. The audio data is developed by an audio data two-dimensional encoder 342, and transmitted to the frame memory 350. The ID code also is developed into an image, and placed in a predetermined position. The data loaded into the frame memory 350 are printed by an ink jet type or thermal type printer 370 as an audio-coded photograph as shown in FIG. 19. The audio-coded photograph has corresponding still images and audio codes to which ordinate numbers, "01" and "02" here, are applied as common ID codes, which facilitates confirmation of the audio codes corresponding to the still images. Numeral 390 denotes a controller for controlling each functional component of the apparatus for making audio-coded photographs.

A construction for checking the contents of the audio data displayed on the monitor 360 will be described next.

A pointing device 381 such as a mouse is used to select the frame of an audio code to be checked. The controller 390 identifies a corresponding audio data from the object makeup information, and reads the corresponding audio data from the storage 320 by means of an audio data retriever 382. The audio data read is put to a necessary decoding process at an audio reproducer 383 and transmitted to a speaker 384 as an amplified analog audio signal. As a result, an original sound is released from the speaker 384. By listening to the sound, the operator is able to check whether the audio code image displayed on the monitor 360 is correctly combined with a still image displayed simultaneously.

In the absence of the selected audio code image from the storage 320, the controller 390 reads only the audio code image corresponding to the selected audio code frame from the frame memory 350 and transmits the code to a reverse converter 385. The reverse converter 385 carries out a process reverse to what is done at the audio data two-dimensional encoder 342, to convert the audio code into audio data. The audio data obtained from the reverse converter 385 is put to a necessary decoding process at the audio reproducer 383 and transmitted to the speaker 384 as an amplified analog audio signal. As a result, an original sound is released from the speaker 384.

In the embodiment shown in FIG. 20, the ID code generator 335 is employed as the recognition sign providing device. This may be constructed as a mark generator for adding a line or the like, in place of the ID code, as a recognition sign, to a composite image to link corresponding image data and audio data. Further, this mark generator may generate a mark which emits a sound (audio code or the like) or light (fluorescence or the like). A fluorescent mark may be overprinted by using a fluorescent ink printer.

In this embodiment (FIG. 19), image data and audio codes are recorded along with ID codes acting as recognition signs on the same page. Where the recognition signs (ID codes) are recorded adjacent the image data and audio codes, respectively, the image data and audio codes may be recorded on separate pages.

Further, where the recognition signs are recorded on the image data and audio codes, correspondence between the image data/audio codes and the recognition signs may be identified with increased reliability.

The audio codes may take the forms of not only the dot codes shown in Patent Laying-Open Publication H7-181606 discussed hereinbefore, but all known audio codes such as two-dimensional bar codes that may be read optically to reproduce sound.

INDUSTRIAL UTILITY

As described above, the image processing apparatus according to this invention is capable of processing two different forms of information, audio and image, as linked through link information. It is convenient in making an audio-coded photograph or the like in which visual images corresponding to image information and audio code images corresponding to audio information are recorded on the same recording medium. The recording medium may be duplicated with ease particularly where the link information includes layout information showing an arrangement of the visual images and audio code images to be recorded on the recording medium.

What is claimed is:

1. An image processing apparatus comprising:

image input means for inputting, as image information, a plurality of photographed images acquired with silver salt type cameras or digital still cameras;

audio input means for inputting, as audio information, a plurality of sound information;

code converting means for converting said audio information into an optically readable audio code image;

a first storage for storing said inputted image information at a predetermined image address in the form of a two-dimensional visual image;

a second storage for storing said audio code image at a predetermined audio address in the form of a two-dimensional code image;

link processing means for assigning a photographed image frame number to an image ID and an audio ID, said image frame number being applied to each of said photographed images, and linking said image ID and said audio ID with said image address and said audio address corresponding respectively thereto based on a user's desired combination between a photographed image and a sound; and a printing device operable to read, in a unit of said image frame number, said image information from said first storage and said audio information from said second storage by means of said image ID and said audio ID, and making a photographic print with an audio cod image added thereto.

2. An image processing apparatus as defined in claim 1, wherein said printing device is operable to record, on printing paper, said audio code image in superposition on said visual image.

3. An image processing apparatus as defined in claim 2, wherein said printing device is operable to record an image on printing paper, said image being obtained after combining said visual image with said audio code image.

* * * * *